United States Patent [19]

Hosoda et al.

[11] Patent Number: 5,468,461
[45] Date of Patent: Nov. 21, 1995

[54] ANTICORROSIVE PRIMER COMPOSITION

[75] Inventors: Yasushi Hosoda, Amagasaki; Toshiaki Shiota, Takatsuki; Nobukazu Suzuki; Satoshi Ikeda, both of Ibaraki; Taketosi Odawa, Hirakata; Koichi Kimura, Osaka; Hisataka Yamamoto, Tokyo, all of Japan

[73] Assignees: Nippon Paint Co., Ltd.; Sumitomo Metal Industries, Ltd., both of Osaka, Japan

[21] Appl. No.: 294,812

[22] Filed: Aug. 25, 1994

Related U.S. Application Data

[63] Continuation of Ser. No. 70,228, Jun. 2, 1993, abandoned.

[30] Foreign Application Priority Data

Jun. 3, 1992 [JP] Japan ................................ 4-142806

[51] Int. Cl.$^6$ ...................... C08G 18/58; C08G 59/56; C08K 3/36; C08K 5/00
[52] U.S. Cl. .................. 523/435; 523/454; 523/458; 523/463; 523/465; 523/466; 523/467
[58] Field of Search ................................ 523/435, 454, 523/458, 463, 465, 466, 467

[56] References Cited

U.S. PATENT DOCUMENTS

| | | |
|---|---|---|
| 3,321,548 | 5/1967 | Sattler . |
| 3,954,693 | 5/1976 | Fong ........................ 523/458 |
| 4,101,497 | 7/1978 | Charves ..................... 523/458 |
| 4,296,167 | 10/1981 | Ceintrey ..................... 528/45 |
| 4,423,171 | 12/1983 | Holubka ..................... 523/454 |
| 4,507,412 | 3/1985 | Hickner ..................... 523/454 |
| 4,756,935 | 7/1988 | Takimoto ..................... 523/465 |
| 4,876,160 | 10/1989 | Shindou et al. . |
| 4,959,277 | 9/1990 | Saeki et al. . |
| 4,970,126 | 11/1990 | Adaniya et al. . |
| 5,110,689 | 5/1992 | Watanabe et al. . |
| 5,147,729 | 9/1992 | Ogishi et al. . |
| 5,188,905 | 2/1993 | Shindou et al. . |

FOREIGN PATENT DOCUMENTS

| | | |
|---|---|---|
| 0307996 | 3/1989 | European Pat. Off. . |
| 0372957 | 6/1990 | European Pat. Off. . |
| 2-134238 | 1/1988 | Japan . |

OTHER PUBLICATIONS

Lee, et al. "Handbook of Epoxy Resins", McGraw-Hill Book Co. New York, N.Y. pp. 8/1–8/7.

Primary Examiner—John C. Bleutge
Assistant Examiner—D. R. Wilson
Attorney, Agent, or Firm—Burns, Doane, Swecker & Mathis

[57] ABSTRACT

An anticorrosive primer composition comprises (1) 100 parts by weight of an epoxy resin having a number-average molecular weight of from 500 to 10,000, (2) from 10 to 60 parts by weight of an aromatic polyamine containing from 2% to 30% by weight, based on the aromatic polyamine, of a promoter selected from the group consisting of phenol compounds and cresol compounds, (3) from 10 to 60 parts by weight of a polyisocyanate, (4) from 10 to 40 phr, based on the sum of components (1), (2), and (3), of silica particles of colloidal silica or fumed silica or a mixture of these, (5) from 0.5 to 5 phr of a lubricant, and (6) an organic solvent. The composition is particularly suitable for use to apply onto the chromate coating of a chromated, zinc-plated steel sheet.

16 Claims, No Drawings

ANTICORROSIVE PRIMER COMPOSITION

This application is a continuation of application Ser. No. 08/070,228, filed Jun 2 1993, now abandoned.

BACKGROUND OF THE INVENTION

The present invention relates to an epoxy resin-based, anticorrosive primer composition suitable for use in the production of anticorrosive steel sheets, particularly those for use in automobiles. The anticorrosive primer composition of the present invention is capable of forming a coating film having improved press formability, corrosion resistance, and electrodeposition coatability.

Anticorrosive steel sheets which have been used in the manufacture of automobile bodies include (1) zinc-plated steel sheets having a plated coating of zinc or a zinc-based alloy formed by electroplating or hot dipping on a substrate steel sheet, (2) chemically-treated, zinc-plated steel sheets having a chemical conversion coating such as a chromate coating on a zinc-plated steel sheet, and (3) organic-coated steel sheets having a thin organic coating formed by application of an anticorrosive primer on a chemically-treated, zinc-plated steel sheet (hereinafter referred to as organic-coated, anticorrosive steel sheets). The anticorrosive ability or corrosion resistance of these steel sheets (1), (2), and (3) increases in that order.

Particularly, organic-coated, anticorrosive steel sheets which have a three-layered protective film consisting of a base zinc-plated coating, a chromate coating, and an upper organic coating film, possess an outstandingly superior corrosion resistance among various surface-treated steel sheets due to the excellent anticorrosive effect of the zinc-based plated coating and the chromate conversion coating associated with the shielding effect of the organic coating film as a barrier to shield from the surrounding environment.

In recent years, as the level of corrosion resistance required for various steel products including automobiles becomes higher, the demand for organic-coated, anticorrosive steel sheets increases. In applications for manufacturing automobile bodies, it is desired that the protective film of such an organic-coated, anticorrosive steel sheet not only exhibit excellent corrosion resistance over a prolonged period of time but also have good electrodeposition coatability and press formability.

It is known that the corrosion resistance of an organic-coated, anticorrosive steel sheet can be further improved by incorporation of fine silica particles such as colloidal silica in the upper organic coating layer thereof. For this purpose, it is desired that silica particles be dispersed uniformly and stably in a coating composition (anticorrosive primer) used to form the organic coating, because otherwise the resulting silica-containing organic coating may have corrosion resistance and other properties which are uneven over the entire surface and a deteriorated surface appearance. Therefore, the stability of dispersed silica particles is important for a silica-containing anticorrosive primer.

Silica-containing coating compositions suitable for use as anticorrosive primers in the formation of organic coatings for anticorrosive steel sheets are disclosed, e.g., in Japanese Patent Application Kokai No. 2-134238 (1990) and U.S. Pat. No. 5,147,729.

The coating composition described in Japanese Patent Application Kokai No. 2-134238(1990) comprises 100 parts by weight of a resin composition, which is a reaction product of a urethane-modified epoxy resin having an epoxy equivalent weight in the range of 1000–5000 with an alkanolamine to add to the epoxy groups in the resin, and from 10 to 150 parts by weight of silica on a solids basis. The urethane-modified epoxy resin is prepared from a mixture of an epichlorohydrin-bisphenol A epoxy resin and a polyalkylene glycol diglycidyl ester by reacting it with bisphenol A followed by a diisocyanate compound.

U.S. Pat. No. 5,147,729 describes a coating composition comprising 100 parts by weight of a resin composition, which is a reaction product of a urethane-modified epoxy resin having an epoxy equivalent weight of 1000–5000 (prepared by reacting a bisphenol A epoxy resin with an isocyanate compound) and a dialkanolamine to add to the epoxy groups of the resin, and from 10 to 150 parts by weight of silica on a solids basis.

However, none of the silica-containing coating compositions, including the above-described ones, known in the prior art as useful in the formation of an organic coating for anticorrosive steel sheets provide satisfactory results with respect to all the required properties of stability of silica particles dispersed in the composition and the corrosion resistance, press formability, and electrodeposition coatability of the resulting organic coating formed from the composition.

SUMMARY OF THE INVENTION

It is an object of the present invention to provide an epoxy resin-based, silica-containing coating composition suitable for use as an anticorrosive primer in the formation of an organic coating for anticorrosive steel sheet used to manufacture automobile bodies.

It is another object of the present invention to provide a silica-containing anticorrosive primer composition having improved stability of dispersed silica particles.

It is a further object of the present invention to provide a silica-containing anticorrosive primer composition capable of forming an organic coating having good corrosion resistance and press formability as well as good electrodeposition coatability.

The term "good electrodeposition coatability" used herein means that when the organic coating formed from the anticorrosive primer composition is subjected to electrodeposition coating, an electrodeposited coating which is free from gas pinholes and which has good surface appearance can be formed on the organic coating.

The present invention provides an anticorrosive primer composition comprising (1) 100 parts by weight of an epoxy resin having a number-average molecular weight of from 500 to 10,000, (2) from 10 to 60 parts by weight of an aromatic polyamine containing from 2% to 30% by weight, based on the aromatic polyamine, of a promoter selected from the group consisting of phenol compounds and cresol compounds, (3) from 10 to 60 parts by weight of a polyisocyanate, (4) from 10 to 40 phr of silica particles of colloidal silica or fumed silica or a mixture of these, (5) from 0.5 to 5 phr of a lubricant, and (6) an organic solvent.

The term "phr" is an abbreviation of per hundred resin and it is used in the context of the present invention to indicate parts by weight based on 100 parts by weight of total resin solids which are the sum of the solids of the epoxy resin component (1), the promoter-containing aromatic polyamine component (2), and the polyisocyanate component (3).

The anticorrosive primer composition can be applied to a chromated, zinc-plated steel sheet to form an organic protective coating. The resulting organic-coated, anticorrosive steel sheet has satisfactory corrosion resistance, press formability, and electrodeposition coatability, and unless the organic coating is too thick, the weldability of the steel sheet is still kept within a level required to assemble automobile bodies.

DETAILED DESCRIPTION OF THE INVENTION

The anticorrosive primer composition according to the present invention comprises (1) an epoxy resin, (2) a promoter-containing aromatic polyamine, (3) a polyisocyanate, (4) colloidal silica and/or fumed silica, (5) a lubricant, and (6) an organic solvent. In the following description, all the parts and percents are by weight unless otherwise indicated.

(1) Epoxy resin:

The epoxy resin constitutes a main vehicle of the anticorrosive primer composition. Epoxy resins known in the art include various classes including glycidyl ethers, glycidyl esters, glycidyl amines, and linear aliphatic or alicyclic epoxides. Any of these epoxy resins can be used in the present invention. In addition, a variety of modified epoxy resins such as acrylate-modified and urethane-modified epoxy resins are also useful in the invention.

Preferably, the epoxy resin is of the glycidyl ether type such as bisphenol or novolak epoxy resins. The bisphenol epoxy resins can be prepared by reacting a bisphenol compound with an epihalohydrin such as epichlorohydrin. The bisphenol compound useful in this reaction includes bisphenol A [=2,2-bis(4-hydroxyphenyl)propane], bisphenol F (=4, 4'-dihydroxydiphenylmethane), and bisphenol S (=4,4'-didihydroxydiphenylsulfone), and brominated or fluorinated derivatives of these compounds. The novolak epoxy resins include phenol novolak resins and cresol novolak resins, both of which can be used in the invention.

The epoxy resin useful in the invention has a number-average molecular weight in the range of from 500 to 10,000 and preferably from 1,000 to 5,000. When the number average molecular weight of the epoxy resin is less than 500, a crosslinking reaction does not proceed sufficiently to increase the molecular weight of the resin to a desired level during baking of a wet film formed from the primer composition, thereby deteriorating the corrosion resistance of the resulting cured organic coating film. An epoxy resin having a number-average average molecular weight of more than 10,000 results in the formation of an organic coating film having an extremely high hardness, leading to a degradation in press formability, and it may also result in a degradation in corrosion resistance due to a loss of crosslink density.

(2) Promoter-containing aromatic polyamine:

The aromatic polyamine component serves as a curing agent for the epoxy resin. Any aromatic compound having two or more primary or secondary amine groups can be used in the invention. Examples of suitable aromatic polyamines include m-phenylenediamine (MPDA), 4,4'-diaminodiphenylmethane (DDM), m-xylylenediamine (MXDA), 4,4'-diaminodiphenylsulfone (DDS), and 4-chloro-phenylenediamine (MOCA).

The aromatic polyamine is used in conjunction with a promoter for the following reason. The anticorrosive primer composition of the present invention is mainly used in the production of organic-coated, anticorrosive steel sheets, which are primarily used in the manufacture of automobile bodies. The steel substrate used in most of these anticorrosive steel sheets is a bake-hardening steel sheet which is designed to undergo hardening during baking of a finish coating, which is normally applied, in the manufacture of automobile bodies, after press forming and assembling. A bake-hardening steel sheet can provide automobile bodies with a significantly enhanced strength by hardening in the finish coating stage without interfering with the preceding press forming stage.

When the steel substrate is a bake-hardening steel sheet, the temperature at which any wet primer film is baked is frequently limited to about 150° C. at highest such that the bake-hardenability of the substrate steel sheet is not inhibited by premature hardening during baking of the primer film. However, since the reactivity of an aromatic polyamine is not so high for electronic reasons, an extremely prolonged baking time is required to bake a wet film of the primer composition at such a limited temperature, thereby greatly diminishing the practical value of the composition.

In order to avoid such a delay in curing by baking at a relatively low temperature, a promoter selected from phenol compounds and cresol compounds is used along with the aromatic polyamine. Useful promoters include such phenol compounds as nonylphenol, salicylic acid, and m-hydroxybenzoic acid as well as such cresol compounds as cresol.

The promoter-containing aromatic polyamine component is used in an amount of from 10 to 60 parts and preferably from 20 parts to 45 parts per 100 parts of the epoxy resin component. When the amount of the aromatic polyamine component (aromatic polyamine+promoter) is less than 10 parts, the resulting primer composition forms a cured organic coating film having a decreased degree of crosslinking, thereby deteriorating the corrosion resistance. Addition of the aromatic polyamine component in excess of 60 parts also results in a decrease in corrosion resistance since unreacted curing agent having free amino groups remains in a cured organic coating film in an increased proportion.

The phenol and/or cresol compound used as a promoter is added to the aromatic polyamine in an amount of from 2% to 30% and preferably from 5% to 25% based on the weight of the aromatic polyamine compound. When the amount is less than 2%, the phenol and/or cresol compound cannot produce a sufficient promoting effect on crosslinking of the epoxy resin, thereby making it difficult to form a cured organic coating film having good corrosion resistance. Addition of more than 30% of the promoter to the aromatic polyamine causes curing of the epoxy resin to proceed excessively, resulting in the formation of an extremely hard cured organic coating film, which deteriorates not only the press formability but also the mechanical properties such as flexural and tensile properties to such a degree that the resulting coated steel sheet no longer withstands stresses applied in practical applications.

(3) Polyisocyanate:

The polyisocyanate also functions as a curing agent. Thus, two classes of curing agents, an aromatic polyamine and a polyisocyanate, are used together in the anticorrosive primer composition. As a result, silica particles can be present in the primer composition as a stable dispersion and the composition can form a cured organic coating film which exhibits improved corrosion resistance and electrodeposition coatability. In the absence of either one of the curing agents, i.e., either the aromatic polyamine or the polyisocyanate, the stability of dispersed silica particles in the primer composition as well as corrosion resistance and electro deposition coatability of a cured organic coating film are degraded.

The polyisocyanate component is also present in the primer composition in an amount of from 10 to 60 parts and preferably from 20 to 45 parts per 100 parts of the epoxy resin component. When the amount of the polyisocyanate is within this range, improvements in the stability of dispersed silica particles and in the corrosion resistance and electrodeposition coatability of a cured organic coating film becomes significant. In contrast, these properties are degraded by addition of the polyisocyanate in an amount of either less than 10 parts or more than 60 parts.

Examples of suitable polyisocyanates which can be used in the present invention include aliphatic or alicyclic diisocyanates such as hexamethylene diisocyanate, isophorone diisocyanate, and hydrogenated diphenylmethane diisocyanate; aromatic diisocyanates such as tolylene diisocyanate and diphenylmethane-4,4'-diisocyanate; triisocyanates such as an adduct of 3 moles of one of the above-named diisocyanates to 1 mole of trimethylolpropane, a trimer of hexamethylene diisocyanate, a trimer of tolylene diisocyanate; and the like.

A polyisocyanate curing agent is often used in a blocked form (called blocked isocyanate) in which the free isocyanate groups have been reacted with a blocking agent. The polyisocyanate component used in the invention may be either of the blocked type or of the non-blocked type, although a blocked type polyisocyanate has the advantage of extending the pot life of the primer composition.

When the polyisocyanate component is used in a blocked form, it should be blocked with a blocking agent having a release-initiating temperature below 160° C. such that the blocking agent can be released by baking of a wet film at a temperature below 160° C. Examples of such a blocking agent include oxime blocking agents such as methyl ethyl ketoxime and cyclohexane oxime; phenolic blocking agents such as phenol, p-tert-butylphenol, and cresol; and ester blocking agents such as ethyl acetoacetate and methyl acetoacetate.

(4) Silica:

In order to provide a cured organic coating film formed from the primer composition with improved corrosion resistance and electrodeposition coatability, silica particles of colloidal silica, fumed silica, or a mixture of these are added in an amount of from 10 to 40 phr and preferably from 15 to 30 phr such that they are dispersed in the primer composition.

Silica in an amount of less than 10 phr is not sufficient to assure that the organic coating film has a satisfactory level of electrodeposition coatability, while the presence of silica in excess of 40 phr causes a deterioration in corrosion resistance and press formability. The silica particles preferably have an average diameter of primary particles in the range of from 8 to 40 nanometers.

Among the two types of silica, colloidal silica is preferred because it can be dispersed in the primer composition into smaller particles and form a dense siloxane network in a cured organic coating film, thereby contributing to improvement in corrosion resistance. Although fumed silica can be used, it has a higher tendency toward the formation of agglomerates in the primer composition so that the average diameter of fumed silica particles (agglomerated particles) present in the primer composition is greater than that of colloidal silica particles. A mixture of these two types of silica may be used.

The colloidal silica used in the present invention may be in the form of an organosol, hydrosol, or mixed sol. It is preferred to use a colloidal silica which has been treated in the form of an alcoholic dispersion so as to modify at least part of the surface of the silica particles with the alcohol, since such treatment provides the colloidal silica with improved dispersibility. The treatment can be performed by dispersing the colloidal silica in an alcohol such as a monohydric alcohol, a polyhydric alcohol, or a mixture of these.

Useful silica particles are normally amorphous and are not substantially agglomerated before they are added to the primer composition. A variety of functional radicals such as anhydrous $SiO_2$ radicals, SiOH radicals, adsorbed organic radicals, and various chemically-bonded ionic radicals are present on the surface of silica particles. They undergo dehydration/condensation and similar reactions during baking of a wet film to form a dense network of siloxane bonds, which serves to enhance the corrosion resistance.

(5) Lubricant:

In order to assure that a cured organic coating film formed from the primer composition has good press formability, a lubricant is present in the primer composition in an amount of from 0.5 to 5 phr and preferably from 1 to 4 phr. The lubricant in an amount of less than 0.5 phr is not sufficient to improve the press formability. Addition of the lubricant in an amount in excess of 5 phr causes a problem in recoatability.

Any lubricant can be used in the invention. Examples of suitable lubricants include polyethylene waxes having a molecular weight of 1,000–10,000, carboxylate ester waxes, polyalkylene glycol waxes, silicone resins, fluorinated resins, and melamine-cyanurate adducts formed by a reaction of 2,4,6-triamino-1,3,5-triazine (melamine) with 2,4,6-trihydroxy-1,3,5-triazine (cyanuric acid) and/or its tautomer.

The above-described components (1) to (5) are essential in the anticorrosive primer composition of the present invention. If desired, one or more additional components may be optionally added to the primer composition. Examples of such optional components include (i) an anticorrosive pigment, (ii) a color pigment, and (iii) other additives.

(i) Anticorrosive pigment:

The anticorrosive primer composition of the present invention is well-balanced with respect to various principal properties desired thereof, including press formability, corrosion resistance, electrodeposition coatability, and stability of dispersed silica particles. When the corrosion resistance is of greater importance, an anticorrosive pigment may be added to the composition. The amount of the anticorrosive pigment, when added, is generally within the range of from 1 to 10 phr.

The anticorrosive pigment is preferably selected from chromate pigments such as strontium chromate, lead chromate, barium chromate, calcium chromate, zinc chromate, and magnesium chromate since they can provide improved corrosion resistance, although other anticorrosive pigments may be employed.

(ii) Color pigment:

One or more color pigments may be added so as to form a colored organic coating film from the primer composition. Such a colored film as the uppermost layer provides the coated steel sheet with an improved aesthetic appearance or makes it easy to distinguish the coated side when the substrate steel is coated with the primer composition on one side. The color pigment, when added, should be present in the primer composition in a minor amount sufficient to color the composition. Useful color pigments include the following:

White pigments—titanium oxide, zinc oxide;

Black pigments—carbon black;

Red pigments—iron oxide, quinacridone red, insoluble azo pigments, azo lake pigments;

Blue pigments—phthalocyanine blue, Prussian blue, ultramarine blue;

Yellow pigments—iron oxide, benzimidazolone yellow.

(iii) Other additives:

In order to improve one or more properties of the anticorrosive primer composition or an organic coating film formed therefrom, the primer composition may further contain one or more other additives conventionally employed in coating compositions, particularly epoxy resin-based coating compositions. Examples of such additives include surface modifiers such as silicones and organic polymers, antisagging agents, dispersants, and thickening agents. Each of these additives may be added normally in an amount of 0.1 to 5 phr.

The anticorrosive primer composition of the present invention usually contains one or more organic solvents to dissolve or disperse the above-described components and give a paintable formulation. The organic solvent used in the primer composition may be any organic solvent which dissolves the base epoxy resin and which can be evaporated by heating at a temperature below 150° C. Suitable organic solvents include ketones such as cyclohexanone, isophorone, and methyl isobutyl ketone, and hydrocarbons such as xylene and toluene. Other various organic solvents including alcohols, ethers, and esters may also be used. The organic solvent may be a mixed solvent consisting of two or more organic solvents. The amount of the organic solvent used is adjusted such that the resulting primer composition has a viscosity suitable for the application technique selected.

The anticorrosive primer composition of the present invention can be prepared by admixing the essential components (1) to (5) and optionally one or more additional components in an organic solvent using a mixing or dispersing device such as a dissolver, ball mill, or sand grinding mill, which are conventionally employed in the formulation of coating compositions. The admixing procedure may be performed in a single step or multiple steps.

The resulting anticorrosive primer composition in which each component is dissolved or dispersed in an organic solvent may be in any form of paint, lacquer, or coating solution (which are generally called "coating compositions") according to the purpose and use thereof.

The anticorrosive primer composition can be applied to form an organic coating film on the surface of a substrate, which is normally a steel sheet and preferably a chromated, zinc-plated steel sheet, by means of a conventional coating device such as a roll coater, spray coating machine, or curtain flow coater.

The thickness of the organic coating film varies depending on the purposes of the coating and a very thin coating film in the range of from 0.1 to 5 µm and preferably from 0.6 to 1.6 µm on a dry basis is usually selected in the production of an organic-coated, anticorrosive steel sheet. A coating film having a thickness of less than 0.1 µm is too thin to improve the corrosion resistance to a satisfactory degree, while a coating film thicker than 5 µm deteriorates the weldability. However, if desired, a thick coating film having a thickness in excess of 5 µm may be employed such that the coated steel sheet can withstand severe corrosive environments.

The resulting wet film of the primer composition is baked at a sufficient temperature for a sufficient time to cure the coated film, thereby providing a coated article having a cured organic coating film. When the steel sheet is of the bake-hardening type, it is preferred to bake the wet film at a temperature below 150° C. as discussed previously. A higher baking temperature may be employed to shorten the baking time when the substrate steel sheet is not bake-hardening.

The anticorrosive primer composition of the present invention is particularly suitable for use in the production of organic-coated anticorrosive steel sheets for the manufacture of automobile bodies since a thin coating formed therefrom is sufficient to improve the corrosion resistance and electrodeposition coatability to a satisfactory degree. In such applications, the substrate to be coated is primarily a steel sheet including various surface-treated steel sheets. However, the primer composition may be applied to other metallic substrates such as aluminum sheets and non-metallic substrates such as various plastics.

When the anticorrosive primer composition is used in the production of organic-coated anticorrosive steel sheets, the substrate to be coated with the primer composition may be a cold-rolled steel sheet itself. However, it is preferable to use a zinc-plated steel sheet having a plated coating of pure zinc or a zinc-based alloy as a substrate since such a plated steel sheet has improved corrosion resistance. The zinc or zinc-based alloy coating may be formed by electroplating, hot dipping (galvanizing), alloyed galvanizing, or vacuum deposition plating. The coating weight of the zinc or zinc alloy plating is not critical, but it is preferably in the range of from 10 to 60 g/m$^2$ on each side in view of a balance between press formability and corrosion resistance. The plated coating may be formed by multilayer plating provided that the uppermost layer is a zinc or zinc-based alloy layer.

Preferably, the zinc- or zinc alloy-plated steel sheet is subjected to chromating to form a chromate coating on the plated coating before it is coated with the primer composition of the invention. A further improvement in corrosion resistance can be attained by such chromating. The chromate coating may be formed by treating the plated steel sheet with a chromating solution of the coating, conversion, or electrolysis type. Among others, a chromating solution of the coating type is most preferred since it gives a chromate film having a particularly improved corrosion resistance. The coating weight of a chromate coating is usually in the range of from 5 to 200 mg/m$^2$ and preferably from 30 to 120 mg/m$^2$ as Cr metal.

As discussed above, a cured film formed from the anticorrosive primer composition of the present invention is improved in corrosion resistance and electrodeposition coatability. Such improved properties cannot be obtained when the composition is free from either the aromatic polyamine or the polyisocyanate.

Although the reason for the improved properties is not completely clear, it is thought that the uniform dispersion of the silica particles in the composition is maintained in the presence of the two classes of curing agents throughout the entire length of time until it is applied and cured, thereby forming a cured organic coating film having a dense network of siloxane bonds formed from the silica particles. Such a dense coating has an increased barrier effect on penetration of external corrosive substances through the coating film, leading to improved corrosion resistance. Furthermore, the dense coating minimizes unevenness of the resistivity of the coating film and prevents passage of a local abnormal current during electrodeposition coating, thereby forming a uniform electrodeposited film having a good surface appearance.

The following examples are presented to further illustrate the present invention. These examples are to be considered in all respects as illustrative and not restrictive.

EXAMPLES

Example 1

(1) The following components were weighed into a 250 cm$^3$ glass bottle and subjected to dispersion with 70 cm$^3$ of glass beads (Toshiba Glass Beads GB-503M) on a paint shaker for 30 minutes to give a silica-dispersed resin solution A which was free from a curing agent.

| | |
|---|---|
| Epikote 1004 (epoxy resin) | 25.0 g |
| Hakusol S-200 (colloidal silica) | 30.8 g |
| Ceridust 3620 (polyethylene wax lubricant) | 0.5 g |
| MC-600 (melamine-cyanurate lubricant) | 0.5 g |
| Cyclohexanone (organic solvent) | 15.0 g |
| Total | 71.8 g |

(2) To the glass bottle containing the silica-dispersed resin solution A, the following components were further added, and the resulting mixture was stirred for 5 minutes with a magnetic stirrer. Thereafter, the mixture was filtered through a 200 mesh screen to give a curing agent-containing epoxy resin-based primer composition.

| | |
|---|---|
| m-Phenylenediamine (diamine) containing 1.1 g of nonylphenol (promoter) | 8.6 g |
| Coronate HX (diisocyanate) | 8.8 g |
| Cyclohexanone (organic solvent) | 10.0 g |
| Total | 27.4 g |

(3) After the resulting epoxy resin-based primer composition was diluted with cyclohexanone to adjust the viscosity to an appropriate level for coating, it was applied on one surface of the chromate coating of a chromated, zinc-plated steel sheet by means of a bar coater so as to give a coating thickness of 1 μm on a dry basis. The wet film was cured by baking at an HMT (highest metal temperature) of 150° C. for 20 seconds to give an organic-coated anticorrosive steel sheet.

The substrate steel sheet used in this example was a zinc-plated steel sheet which had a Zn-13% Ni alloy electroplated coating with a coating weight of 30 g/m$^2$ on each surface of a 0.7 mm-thick cold-rolled steel sheet. Before use in the example, the zinc-electroplated steel sheet had been subjected to alkaline degreasing and then chromate treatment using a chromating solution of the coating type (Surfchrome 92; Nippon Paint) to give a chromate coating having a weight of 60 mg/m$^2$ on each electroplated coating.

The stability of dispersed silica particles in the primer composition, and the corrosion resistance, electrodeposition coatability, and press formability of the organic-coated anticorrosive steel sheet were evaluated by the testing procedures described below.

Examples 2–27 and Comparative Examples 1 to 13

Following the procedure described in Example 1, various epoxy resin-based primer compositions were prepared by varying the amount or amounts of one or more components or using a different component, and the resulting primer compositions were used to coat the same chromated, zinc-plated substrate steel sheet as used in Example 1 to give organic-coated, anticorrosive steel sheets. When the composition contained a color pigment and/or anticorrosive pigment, the pigment was dispersed along with the colloidal silica in the preparation of the silica-dispersed resin solution A. The following components were used in the primer compositions prepared in these examples. In the list given below, Mn is the number-average molecular weight and NV is the nonvolatile content (wt %).

(1) Epoxy resins:
 (a) Bisphenol A epoxy resins
  (A) Epikote 828 (Shell Chemical; Mn=400, NV=100%)
  (B) Epikote 1001 (Shell Chemical; Mn=1000, NV=100%)
  (C) Epikote 1004 (Shell Chemical; Mn=2000, NV=100%)
  (D) Epikote 1007 (Shell Chemical; Mn=4000, NV=100%)
 (b) Bisphenol F epoxy resin
  (E) Epotote YDF 2004 (Toto Kasei; Mn=1900, NV=100%)
 (c) Phenol novolak epoxy resins
  (F) Epiclon N740 (Dai-Nippon Ink and Chemical; Mn=540, NV=100%)
  (G) Epiclon N775 (Dai-Nippon Ink and Chemical; Mn=1000, NV=100%)
 (d) Cresol novolak epoxy resins
  (H) Epiclon N673 (Dai-Nippon Ink and Chemical; Mn=900, NV=100%)
  (I) Epotote YDCN 701 (Toto Kasei; Mn=1700, NV=100%)
  (J) Epotote YDCN 704 (Toto Kasei; Mn=3050, NV=100%)
 (e) Phenoxy epoxy resin
  (K) Phenotote YP 50 (Toto Kasei; Mn=11800, NV=100%)

Among the above epoxy resins, Epoxy Resins (A) and (K) are comparative components since they have a molecular weight outside the range defined herein (500–10,000).

(2) Aromatic polyamines:
  (A) m-Phenylenediamine (NV=100%)
  (B) 4,4'-Diaminodiphenylmethane (NV=100%)
(3) Promoters:
  (A) Nonylphenol (NV=100%)
  (B) Salicylic acid (NV=100%)
(4) Polyisocyanates:
 (a) Hexamethylene diisocyanate
  (A) Coronate HX (Nippon Polyurethane; NV=100%)
 (b) Isophorone diisocyanate
  (B) Desmodur Z-4370 (Sumitomo Bayer Urethane; NV=70%)
 (c) Isophorone diisocyanate (blocked with methyl ethyl ketoxime)
  (C) Desmodur BL-4165 (Sumitomo Bayer Urethane; NV=65%, release-initiating temp.=140°–160° C.)
(5) Silica:
 (a) Colloidal silica
  (A) Hakusol S-200 (Tohaku Naruko; NV=35%, average diameter of primary particles=20 nm)
 (b) Fumed silica
  (B) Aerosil 300 (Nippon Aerosil; NV=100%, average diameter of primary particles=8 nm)
(6) Lubricants:
 (a) Polyethylene wax
  (A) Ceridust 3620 (Hoechst Japan)
 (b) Melamine-cyanurate adduct
  (B) MC-600 (Nissan Kagaku)
(7) Pigments:
 (a) Color pigment
  (A) Indian red (red iron oxide pigment)
 (b) Anticorrosive pigment
  (B) Barium chromate

Testing Procedures (1) Stability of dispersed silica particles in primer composition:

A 60 cm$^3$ sample of each primer composition after dilution was put into a 100 cm$^3$ test tube and allowed to stand for 3 days in a room at 20° C. The stability of dispersion of silica particles was evaluated by visual observation of the primer composition after standing and agitation with a spatula. The results were rated as follows:

⊙ Well dispersed with no sedimentation of silica,

○ A slight amount of silica sedimented, which could readily be dispersed by agitation with a spatula, Δ A considerable amount of silica sedimented, which could be dispersed by agitation with a spatula, X Sedimented silica could not be dispersed by agitation with a spatula.

(2) Corrosion resistance:

A test specimen of each organic-coated, anticorrosive steel sheet was subjected to 100 cycles of an accelerated corrosion test, each cycle consisting of immersion in a 5% NaCl solution at 40° C. for 7.5 minutes, exposure to a moist atmosphere (RH=95%) at 40° C. for 15 minutes, and drying at 60° C. for 7.5 minutes. Thereafter, the organic-coated surface of the test specimen was visually observed for the formation of rust. The corrosion resistance was evaluated on the basis of the percent of the surface of the test specimen covered by rust as follows:

⊙ No rust observed,

○ Less than 10% of the entire surface covered with rust,

Δ Less than 50% of the entire surface covered with rust,

X More than 50% of the entire surface covered with rust.

(3) Electrodeposition coatability

Electrodeposition coating was performed on a test specimen of each organic-coated, steel sheet using a commercially-available paint for electrodeposition (Power-Top U-50; Nippon Paint) by passing an electric current for 3 minutes under such conditions that the voltage increased to 170 V after 30 seconds and then baking for 20 minutes at 170° C. to form an electrodeposited coating on the surface of the organic coating film of the test specimen. The number of gas pinholes generated on the surface of the electrodeposited coating was counted by visual observation and the electrodeposition coatability was evaluated on the basis of the number of gas pinholes as follows:

⊙ No gas pinhole generated,

○ 1–3 Gas pinholes generated per square centimeters,

Δ 4–10 Gas pinholes generated per square centimeters,

X More than 10 gas pinholes generated per square centimeters.

(4) Press formability

Press forming was performed on a test specimen of each organic-coated, anticorrosive steel sheet by subjecting it to cylindrical deep drawing with a diameter of 50 mm and a depth of 50 mm. The shoulder of the die being used was ground with a #120 Emery paper before each press forming test. After an adhesive tape was attached to the deformed portion of the test specimen and immediately peeled off, the deformed portion was observed under a 500X microscope and the press formability was evaluated as follows:

⊙ No abnormality in the coating,

○ Only cracks observed in the coating (no flaking),

Δ Slight flaking of the coating observed,

X Significant flaking of the coating observed.

The composition of each primer composition prepared in the examples and comparative examples and the test results are summarized in Tables 1 and 2 below, respectively.

TABLE 1

| No. | Epoxy | Amine | Promoter | Isocyanate | Silica | Lubricant | Pigment |
|---|---|---|---|---|---|---|---|
| EXAMPLES | | | | | | | |
| 1 | C (100) | A (30) | A (4.5) | A (35) | A (121.3) | A (2), B (2) | — |
| 2 | C (100) | A (10) | A (1.5) | A (35) | A (121.3) | A (2), B (2) | — |
| 3 | C (100) | A (50) | A (7.5) | A (35) | A (121.3) | A (2), B (2) | — |
| 4 | C (100) | A (30) | A (4.5) | A (15) | A (121.3) | A (2), B (2) | — |
| 5 | C (100) | A (30) | A (4.5) | A (55) | A (121.3) | A (2), B (2) | — |
| 6 | C (100) | A (30) | A (4.5) | A (35) | A (48.7) | A (2), B (2) | — |
| 7 | C (100) | A (30) | A (4.5) | A (35) | A (188.8) | A (2), B (2) | — |
| 8 | C (100) | A (30) | A (4.5) | A (35) | A (121.3) | A (0.5) B (0.5) | — |
| 9 | C (100) | A (30) | A (4.5) | A (35) | A (121.3) | B (2) | — |
| 10 | C (100) | A (30) | A (4.5) | A (35) | A (121.3) | A (2) | — |
| 11 | B (100) | A (30) | A (4.5) | A (35) | A (121.3) | A (2), B (2) | — |
| 12 | D (100) | A (30) | A (4.5) | A (35) | A (121.3) | A (2), B (2) | — |
| 13 | E (100) | A (30) | A (4.5) | A (35) | A (121.3) | A (2), B (2) | — |
| 14 | F (100) | A (30) | A (4.5) | A (35) | A (121.3) | A (2), B (2) | — |
| 15 | G (100) | A (30) | A (4.5) | A (35) | A (121.3) | A (2), B (2) | — |
| 16 | H (100) | A (30) | A (4.5) | A (35) | A (121.3) | A (2), B (2) | — |
| 17 | I (100) | A (30) | A (4.5) | A (35) | A (121.3) | A (2), B (2) | — |
| 18 | J (100) | A (30) | A (4.5) | A (35) | A (121.3) | A (2), B (2) | — |
| 19 | C (100) | B (30) | A (4.5) | A (35) | A (121.3) | A (2), B (2) | — |
| 20 | C (100) | B (30) | B (4.5) | A (35) | A (121.3) | A (2), B (2) | — |
| 21 | C (100) | A (30) | A (4.5) | B (50) | A (121.3) | A (2), B (2) | — |
| 22 | C (100) | A (30) | A (4.5) | C (54) | A (121.3) | A (2), B (2) | — |
| 23 | C (100) | A (30) | A (4.5) | A (35) | B (42.4) | A (2), B (2) | — |
| 24 | C (100) | A (30) | A (0.6) | A (35) | A (121.3) | A (2), B (2) | — |
| 25 | C (100) | A (30) | A (9) | A (35) | A (121.3) | A (2), B (2) | — |
| 26 | C (100) | A (30) | A (4.5) | A (35) | A (121.3) | A (2), B (2) | A (5) |
| 27 | C (100) | A (30) | A (4.5) | A (35) | A (121.3) | A (2), B (2) | B (5) |
| COMPARATIVE EXAMPLES | | | | | | | |

TABLE 1-continued

| No. | Primer Composition (parts by weight) | | | | | | |
|---|---|---|---|---|---|---|---|
| | Epoxy | Amine | Promoter | Isocyanate | Silica | Lubricant | Pigment |
| 1 | C (100) | A (8)* | A (1.2) | A (35) | A (121.3) | A (2), B (2) | — |
| 2 | C (100) | A (62)* | A (9.2) | A (35) | A (121.3) | A (2), B (2) | — |
| 3 | C (100) | A (30) | A (0.45)* | A (35) | A (121.3) | A (2), B (2) | — |
| 4 | C (100) | A (30) | A (12)* | A (35) | A (121.3) | A (2), B (2) | — |
| 5 | C (100) | A (30) | A (4.5) | A (8)* | A (121.3) | A (2), B (2) | — |
| 6 | C (100) | A (30) | A (4.5) | A (70)* | A (121.3) | A (2), B (2) | — |
| 7 | C (100) | A (30) | A (4.5) | A (35) | A (29.1)* | A (2), B (2) | — |
| 8 | C (100) | A (30) | A (4.5) | A (35) | A (242.5)* | A (2), B (2) | — |
| 9 | A* (100) | A (30) | A (4.5) | A (35) | A (121.3) | A (2), B (2) | — |
| 10 | K* (100) | A (30) | A (4.5) | A (35) | A (121.3) | A (2), B (2) | — |
| 11 | C (100) | A (30) | A (4.5) | —* | A (121.3) | A (2), B (2) | — |
| 12 | C (100) | —* | — | A (35) | A (121.3) | A (2), B (2) | — |
| 13 | C (100) | A (30) | A (4.5) | A (35) | A (121.3) | —* | — |

*Outside the range defined herein.

TABLE 2

| No. | Stability dispersed silica | Corrosion Resistance | Electro-deposition coatability | Press form-ability |
|---|---|---|---|---|
| EXAMPLES | | | | |
| 1 | ⊚ | ⊚ | ⊚ | ⊚ |
| 2 | ⊚ | ○ | ⊚ | ⊚ |
| 3 | ⊚ | ⊚ | ○ | ⊚ |
| 4 | ⊚ | ⊚ | ○ | ⊚ |
| 5 | ⊚ | ○ | ⊚ | ⊚ |
| 6 | ⊚ | ⊚ | ○ | ⊚ |
| 7 | ○ | ○ | ⊚ | ○ |
| 8 | ⊚ | ⊚ | ⊚ | ○ |
| 9 | ⊚ | ⊚ | ⊚ | ○ |
| 10 | ⊚ | ⊚ | ⊚ | ○ |
| 11 | ⊚ | ⊚ | ⊚ | ⊚ |
| 12 | ⊚ | ⊚ | ⊚ | ⊚ |
| 13 | ⊚ | ⊚ | ⊚ | ⊚ |
| 14 | ⊚ | ⊚ | ⊚ | ⊚ |
| 15 | ⊚ | ⊚ | ⊚ | ⊚ |
| 16 | ⊚ | ⊚ | ⊚ | ⊚ |
| 17 | ⊚ | ⊚ | ⊚ | ⊚ |
| 18 | ⊚ | ⊚ | ⊚ | ⊚ |
| 19 | ⊚ | ⊚ | ⊚ | ⊚ |
| 20 | ⊚ | ⊚ | ⊚ | ⊚ |
| 21 | ⊚ | ⊚ | ⊚ | ⊚ |
| 22 | ⊚ | ⊚ | ⊚ | ⊚ |
| 23 | ⊚ | ○ | ○ | ⊚ |
| 24 | ⊚ | ○ | ⊚ | ⊚ |
| 25 | ⊚ | ⊚ | ⊚ | ○ |
| 26 | ⊚ | ⊚ | ⊚ | ⊚ |
| 27 | ⊚ | ⊚ | ○ | ⊚ |
| COMPARATIVE EXAMPLES | | | | |
| 1 | ○ | △ | ○ | ⊚ |
| 2 | ○ | △ | ○ | ⊚ |
| 3 | ○ | △ | ○ | ⊚ |
| 4 | ○ | ○ | ○ | △ |
| 5 | △ | ○ | △ | ⊚ |
| 6 | △ | ○ | △ | ⊚ |
| 7 | ○ | ○ | △ | ⊚ |
| 8 | ○ | △ | ○ | △ |
| 9 | ○ | X | ○ | ⊚ |
| 10 | ○ | ○ | △ | △ |
| 11 | △ | △ | X | ⊚ |
| 12 | X | X | △ | ⊚ |
| 13 | ⊚ | ⊚ | ⊚ | △ |

As can be seen from Table 2, the anticorrosive primer compositions according to the present invention were improved with respect to all the properties tested, i.e., stability of dispersed silica in the composition, and corrosion resistance, electrodeposition coatability, and press formability of the organic-coated steel sheets in spite of the fact that the organic coating on each steel sheet was very thin (1 μm). Such a thin organic coating will not interfere with spot welding.

In contrast, when the molecular weight of the base epoxy resin or the proportion of one or more components was outside the range defined herein, at least one of the properties tested degraded.

It will be appreciated by those skilled in the art that numerous variations and modifications may be made to the invention as described above with respect to specific embodiments without departing from the spirit or scope of the invention as broadly described.

What is claimed is:

1. An anticorrosive primer composition comprising:

(1) 100 parts by weight of an epoxy resin having a number-average molecular weight of from 500 to 10,000, wherein the epoxy resin is selected from the group consisting of glycidyl ethers, glycidyl esters, glycidylamines, linear aliphatic or alicyclic epoxides, and acrylate-modified epoxy resins or urethane-modified epoxy resins, (2) from 10 to 60 parts by weight of an aromatic polyamine having at least two primary or secondary amine groups and containing from 2% to 30% by weight, based on the aromatic polyamine, of a promoter selected from the group consisting of phenol compounds and cresol compounds, (3) from 10 to 60 parts by weight of a polyisocyanate which is non-blocked or blocked with a blocking agent having a release-initiating temperature of below 160° C., (4) from 10 to 40 phr, based on the sum of components (1), (2), and (3), of silica particles of colloidal silica or fumed silica or a mixture of these, (5) from 0.5 to 5 phr, based on the sum of components (1), (2), and (3), of a lubricant, and an organic solvent.

2. The anticorrosive primer composition of claim 1, wherein the epoxy resin is a glycidyl ether epoxy resin.

3. The anticorrosive primer composition of claim 1, wherein the epoxy resin has a number-average molecular weight in the range of 1,000–5,000.

4. The anticorrosive primer composition of claim 1, wherein the promoter is present in an amount of 5% to 25% by weight based on the weight of the polyamine.

5. The anticorrosive primer composition of claim 1, wherein the promoter-containing aromatic polyamine is present in an amount of from 20 to 45 parts by weight.

6. The anticorrosive primer composition of claim 1, wherein the polyisocyanate is present in an amount of from 20 to 45 parts by weight.

7. The anticorrosive primer composition of claim 1, wherein the silica particles are present in an amount of from 15 to 30 phr.

8. The anticorrosive primer composition of claim 1, wherein the silica particles are colloidal silica.

9. The anticorrosive primer composition of claim 1, wherein the silica particles are surface-modified by treatment with an alcohol.

10. The anticorrosive primer composition of claim 1, wherein the lubricant is present in an amount of from 1 to 4 phr.

11. The anticorrosive primer composition of claim 1, wherein the lubricant is selected from the group consisting of polyethylene waxes, carboxylate ester waxes, polyalkylene glycol waxes, silicone resins, fluorinated resins, melamine-cyanurate adducts and mixtures thereof.

12. The anticorrosive primer composition of claim 11, wherein the lubricant is a polyethylene wax or a melamine-cyanurate adduct or a mixture of these.

13. The anticorrosive primer composition of claim 1, wherein the organic solvent is selected from the group consisting of ketones, hydrocarbons, alcohols, ethers, and esters.

14. The anticorrosive primer composition of claim 1, which further comprises one or more additives selected from the group consisting of anticorrosive pigments, color pigments, surface modifiers, antisagging agents, dispersants, and thickening agents.

15. The anticorrosive primer composition of claim 14, wherein the composition comprises an anticorrosive pigment in an amount of 1 to 10 phr.

16. The anticorrosive primer composition of claim 1, wherein the polyisocyanates are blocked with a blocking agent having a release-initiating temperature of below 160° C.

* * * * *